United States Patent [19]
Panner et al.

[11] Patent Number: 6,009,478
[45] Date of Patent: Dec. 28, 1999

[54] FILE ARRAY COMMUNICATIONS INTERFACE FOR COMMUNICATING BETWEEN A HOST COMPUTER AND AN ADAPTER

[75] Inventors: Bryan K. Panner, Nashua; Timothy Lee Hoskins, Amherst; Richard Napolitano, Hollis, all of N.H.

[73] Assignee: Adaptec, Inc., Milpitas, Calif.

[21] Appl. No.: 08/963,902

[22] Filed: Nov. 4, 1997

[51] Int. Cl.⁶ .................................................. G06F 13/00
[52] U.S. Cl. .................................. 710/5; 707/1; 709/300; 710/129; 711/114
[58] Field of Search .................. 707/1–10, 100–104, 707/200–206; 709/200–204, 217–219, 301–305; 710/5–7, 20–24, 33–35, 72–74, 129–130; 711/111–114

[56] References Cited

U.S. PATENT DOCUMENTS

| | | | |
|---|---|---|---|
| 5,163,131 | 11/1992 | Row et al. ................................ | 395/200 |
| 5,463,772 | 10/1995 | Thompson et al. ...................... | 707/101 |
| 5,566,331 | 10/1996 | Irwin, Jr. et al. .......................... | 707/10 |
| 5,603,003 | 2/1997 | Akizawa et al. ......................... | 711/114 |
| 5,619,690 | 4/1997 | Matsumani et al. ..................... | 707/200 |
| 5,692,128 | 11/1997 | Bolles et al. ............................. | 709/224 |
| 5,715,452 | 2/1998 | Mori et al. ............................... | 707/201 |
| 5,809,516 | 9/1998 | Ukai et al. ............................... | 711/114 |
| 5,835,943 | 11/1998 | Yohe et al. .............................. | 711/118 |
| 5,892,969 | 4/1999 | Young .......................................... | 710/5 |
| 5,913,028 | 6/1999 | Wang et al. ............................. | 709/203 |
| 5,930,817 | 7/1999 | Mizuno et al. .......................... | 711/114 |
| 5,933,824 | 8/1999 | DeKoning et al. ......................... | 707/8 |

*Primary Examiner*—Christopher B. Shin
*Attorney, Agent, or Firm*—Cesari and McKenna, LLP

[57] ABSTRACT

A file array communications transport system transports unique packets between a host computer and an adapter of a data processing platform in accordance with a file array protocol. The protocol is manifested as an exchange of these unique packets and the file array transport comprises an arrangement of logic circuits and data structures needed to exchange these packets over a tightly-coupled, low latency interface of a file array storage architecture.

15 Claims, 9 Drawing Sheets

FILE ARRAY COMMUNICATIONS INTERFACE FOR COMMUNICATING BETWEEN A HOST COMPUTER AND AN ADAPTER

FIELD OF THE INVENTION

This invention relates generally to storage architectures of data processing systems and, more specifically, to a communications interface of a storage architecture.

BACKGROUND OF THE INVENTION

An operating system is a large, complex piece of software whose primary function is the management of hardware and software resources of a data processing system such as processors, memory and storage. Storage management, in turn, involves the organization of storage devices, such as disks, into logical groupings to achieve various performance and availability characteristics. For example, the disks may be arranged to create individual volumes or concatenations of volumes, mirror sets or stripes of mirror sets, or even redundant arrays of independent disks (RAID). The data processing platform on which the operating system executes to provide such management functions typically includes a host computer coupled to a storage adapter or controller. The operating system functionally organizes this platform by, inter alia, invoking input/output (I/O) operations in support of software processes or applications executing on the computer.

A storage architecture of the operating system decomposes management of the storage devices into individual components and defines their functional operations with respect to the flow of information and control among them. The individual components include an I/O subsystem and a file system, each of which is generally independent of one another and interact according to interfaces defined by the architecture. The I/O subsystem provides an efficient mode of communication between the computer and the disks that allows programs and data to be entered into the memory of the computer for processing; the subsystem also enables the results obtained from computations of that information to be recorded on the disks.

The file system contains general knowledge of the organization of information on the storage devices and provides algorithms that implement properties of the desired storage architecture. To that end, the file system is a high-level software entity comprising a collection of program modules, e.g., software drivers, that incorporate a command set for the storage devices/disks. Typically, the operating system implements a file system to logically organize the information as a hierarchical structure of files on the disks.

I/O processing is typically performed under the auspices of the file system in that applications typically interact with the file system to manipulate (i.e., read or write) the files. I/O subsystems, on the other hand, interact with disks at lower software levels by manipulating blocks of data. Accordingly, a single I/O transaction operation requested by an application to the file system may spawn into many I/O transfer operations between the I/O subsystem and disks; that is, there may be multiple data transfers between the lower-layer software entities and the actual hardware devices.

Some storage architectures provide their file systems and I/O subsystems entirely on the controller of the data processing platform. Here, the host computer interacts with the controller in accordance with a conventional client-server computing model wherein the host computer ("client") forwards each I/O transaction request to the controller ("server") typically across an interconnection such as a network. Architectures implementing the client-server model are typically referred to as loosely-coupled or distributed system architectures because computations are distributed among several computing elements, each with its own processor and memory. In contrast, tightly-coupled systems are characterized by computing elements that share communication resources, such as an interface or bus.

An example of a server-specific I/O architecture that is optimized for file operations of a Unix file server is described in U.S. Pat. No. 5,163,131 titled Parallel I/O Network File Server Architecture by Edward J. Row et al, issued on Nov. 10, 1992. Row discloses a file server architecture that comprises one or more network controllers, one or more file controllers, one or more storage processors, and a memory interconnected by a message passing bus and operating in parallel with the Unix host. Client requests for file operations are transmitted to a file controller which, independently of the Unix host, manages a virtual file system of a mass storage device coupled to the storage processors.

Although the architecture described in Row relieves the host processor from I/O processing, it also adversely affects file system latency, i.e., the period of time between the issuance of an I/O transaction request by an application to the file system and the completion of that request by the file system. In general, file system latency increases with an architecture having a file system that is remote from the processing platform on which the application executes.

Therefore, it is an object of the present invention to provide a storage architecture communication interface of a data processing system that increases overall file system performance.

SUMMARY OF THE INVENTION

The invention comprises a file array communications transport for transporting unique packets between a host computer and an adapter of a data processing platform in accordance with a file array protocol. Broadly stated, the protocol is manifested as an exchange of these unique packets and the file array transport comprises an arrangement of logic circuits and data structures needed to exchange these packets over a tightly-coupled, low latency interface of a file array storage architecture. The architecture also includes a file system distributed between the host computer, i.e., a client file system, and a file array adapter, i.e., a server file system, and an input/output (I/O) subsystem resident on the adapter.

According to an aspect of the invention, the file array communications transport is implemented in accordance with a memory-based mechanism comprising (i) host-based command and response queues; (ii) an adapter-based "doorbell register", i.e., a control status register (CSR) for generating a unique interrupt at the adapter and host; (iii) a direct memory access (DMA) engine of the adapter for accessing the host memory; and (iv) DMA map register capability which may comprise actual hardware registers or virtual registers constructed in host memory.

In the illustrative embodiment, the command and response queues are independent communication regions in host memory that are shared by the file array adapter and the host computer. Each communication region comprises a number of queue entries (QEs); a QE is a placeholder used to communicate an I/O operation between the host and the adapter. To that end, each QE maintains a pointer to a command-specific file array information block (FIB).

In accordance with another aspect of the present invention, the unique packet transported between the host and adapter is a FIB; the FIB is preferably allocated from host memory of the host computer and contains all of the state required to express a complete I/O operation. The file array protocol comprises an exchange of these FIBs between the host computer and the file array adapter to deliver I/O operations through QEs passed within the command and response queues.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
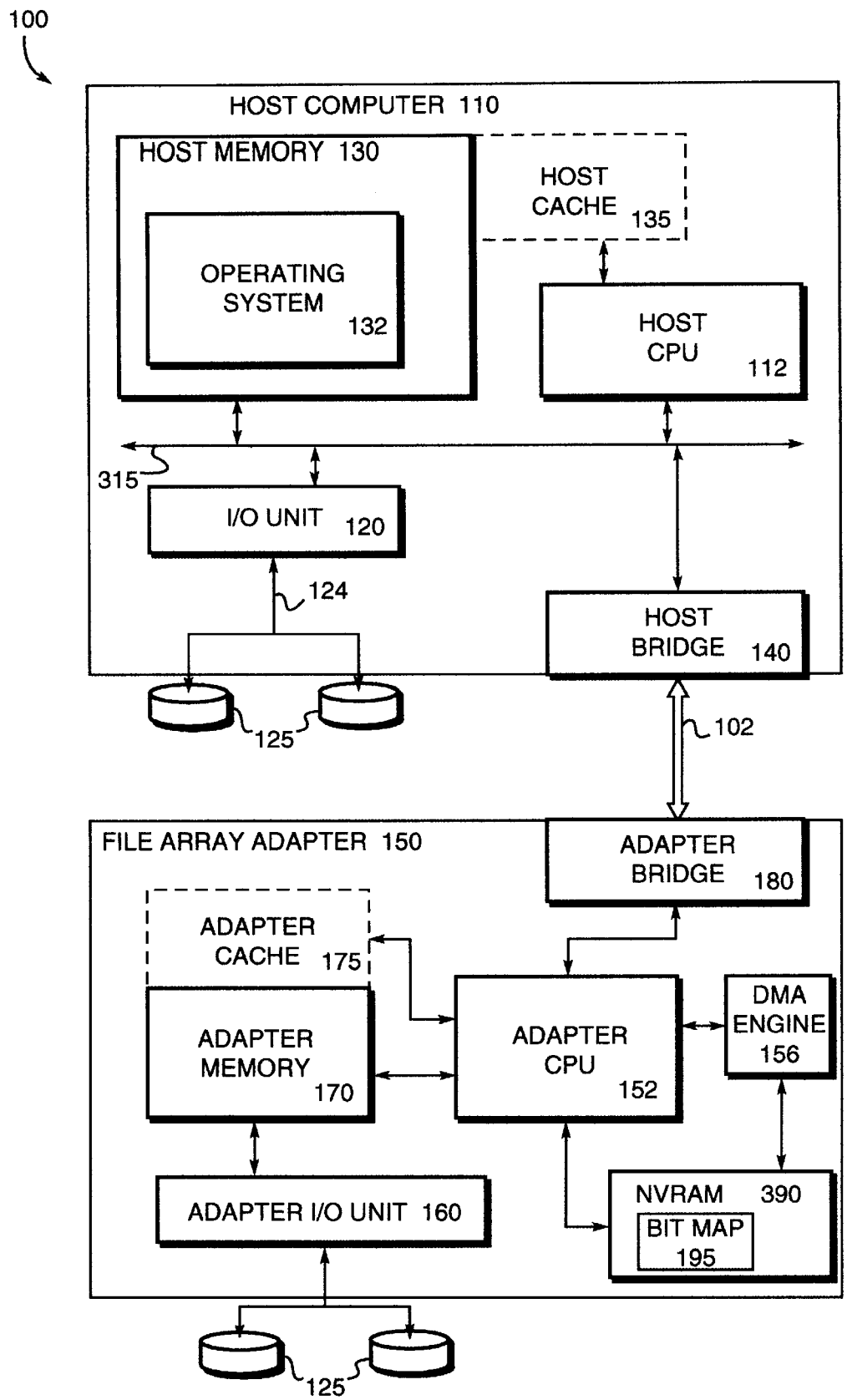
FIG. 1 is a block diagram of a data processing platform upon which a novel distributed file array storage architecture may advantageously operate.

FIG. 1 is a block diagram of a data processing platform 100 comprising of a host computer 110 coupled to a file array adapter 150 over a tightly-coupled, low latency interface 102. In the illustrative embodiment described herein, the low-latency interface is preferably a peripheral component interconnect (PCI) bus that connects to the host computer 110 through a host bridge 140 and to the adapter 150 through an adapter bridge 180. The PCI bus is an open, high-speed interconnect that minimizes intervening circuitry to decrease system cost while increasing system reliability.

The host computer 110 comprises a host central processing unit (CPU) 112, a host memory 130 and an input/output (I/O) unit 120 interconnected by a system bus 115. The I/O unit 120 is, in turn, coupled to mass storage devices, such as disks 125, via channels 124. An operating system 132, portions of which are typically resident in host memory 130 and executed by the host CPU 112, functionally organizes the computer 310 by, inter alia, invoking I/O operations in support of software processes or application programs executing on the computer.

The file array adapter 150 comprises an adapter CPU 152 coupled to an adapter memory 170 and an adapter I/O unit 160, the latter containing the port circuitry needed to connect the adapter to disks 125. The adapter 150 further comprises a direct memory access (DMA) engine 156 coupled to the CPU 152 that enables the adapter to execute DMA operations with the host computer 110. That is, the DMA engine 156 transfers data directly into and out of host memory 130, thereby eliminating the need for the host CPU to participate in data transfers between the adapter memory 170 and host memory 130.

In the illustrative embodiment, the host and adapter memories generally comprise read-only and random access memory storage locations addressable by the CPUs for storing software programs and data structures associated with a novel file array storage architecture described herein. Portions of the host memory 130 and the adapter memory 170 are configured to provide a host cache 135 and an adapter cache 175, respectively, for holding most recently accessed information such as code or data. In addition, a battery-backed, non-volatile random access memory (NVRAM 190) is provided on the adapter 150 for logging transactions pertaining to user data and metadata, i.e., data pertaining to the file system structure. It will be apparent to those skilled in the art that other memory means, including various computer readable media, may be used for storing and executing program instructions pertaining to the inventive techniques described herein.

The File Array Architecture

A function of the operating system 132 is the management of the data processing system storage such as caches and disks. The file array storage architecture provides storage subsystem services that focus primarily on I/O capacity for such storage. In general, the file array architecture consolidates and shifts the software code boundaries of conventional storage architectures to produce a file array system comprising an I/O subsystem and a distributed file system capable of high performance. By shifting the software boundary, a substantial amount of code that is typically executed by the host CPU during I/O processing is offloaded onto the adapter thereby relieving the host computer for other functions, such as application development. An example of a storage architecture suitable for use with the present invention is described in copending and commonly-assigned U.S. patent application Ser. No. (112036-0005), entitled File Array Storage Architecture, which application is hereby incorporated by reference as though fully set forth herein.

Figure 2:
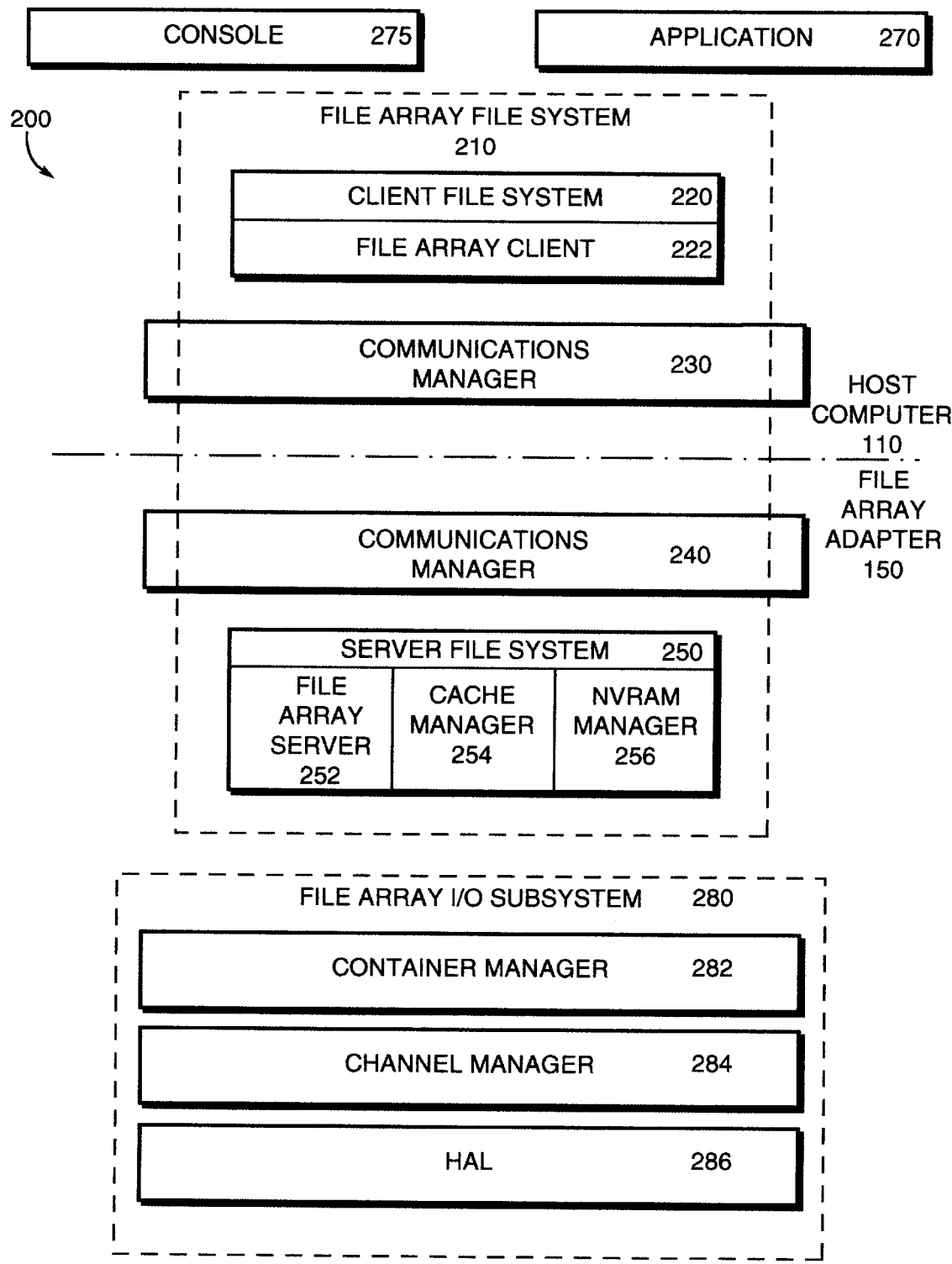
FIG. 2 is a schematic block diagram of the file array architecture comprising a client file system and a server file system in accordance with the present invention.

FIG. 2 is a schematic block diagram of the distributed file array system architecture 200 that includes a file array file system 210 which is preferably implemented in accordance with a modified client-server computing model; that is, the file system 210 includes a client file system 220 located on the host computer 110 and a server file system 250 resident on the adapter 150. In addition, the architecture includes a file array I/O subsystem 280 that is located entirely on the adapter 150; therefore, software code constituting the server file system 250 and the I/O subsystem 280 execute on the adapter CPU 152.

In the illustrative embodiment, the operating system is preferably the Windows NT operating system (hereinafter "Windows NT") developed by Microsoft Corporation. Windows NT incorporates an I/O system that provides a framework for delivering I/O requests to file systems and returning results to applications. File systems are viewed by Windows NT as sophisticated device drivers that can be dynamically loaded into the operating system; the novel file array system thus "plugs into" the Windows NT operating system at an installable file system (IFS) interface. In addition, the I/O subsystem 280 generally replaces the Windows NT I/O system. It should be noted, however, that other operating systems may be used in connection with the distributed storage architecture described herein. Furthermore, the file array software architecture described herein may be configured to be ported across different adapters.

As shown in FIG. 2, the client file system 220 comprises a file array client software driver component 222 that interfaces with a communications manager software component 230; these components execute on the host CPU 112 and share host memory 130. The file array client 222 conforms to IFS and interfaces to the Windows NT operating system in a manner similar to other supported file systems. In other words when plugged into the Windows NT operating system, the client file system 220 supports all base requirements of the operating system including object modeling and cache management. As described further herein, the communications manager 230 exchanges and processes I/O requests/responses over the PCI bus 102 with one or more file array adapters 150.

The server file system 250 embodies underlying resources that enable asynchronous operation with respect to the host computer so as to provide high data availability and increased system bandwidth while reducing host CPU interruption. The server file system 250 is also configured to optimize and execute I/O requests and, to that end, comprises a plurality of software code components that interface with a communications manager 240 of the adapter. Those software components include a file array server driver component 252, a cache manager 254 and NVRAM manager 256. The NVRAM manager 256 is a software entity that interacts with the NVRAM 190 to manipulate file system metadata and reduce disk accesses, as described below. The file array server 252 provides a framework for scheduling, staging, executing and returning completed I/O operation results to the file array client 222, whereas the file array cache manager 264 is a software entity that implements various caching strategies using the adapter cache to improve system performance.

The file array I/O subsystem 280 comprises a container manager 282, a channel manager 284 and a hardware abstraction layer (HAL) 286. The channel manager 284 implements protocols for communicating with the disk drives over channels of the adapter and, thus, performs the functions of a conventional class driver, device-specific drivers, e.g., a small computer system interface (SCSI) drivers, and port drivers. HAL 286 directly manipulates the file array hardware, including the port interface circuitry of the adapter I/O unit 160, and insulates the file array software components from hardware details to facilitate upgrading or porting of the software to other hardware platforms. The container manager 282 is a software entity that manages containers, i.e., "free space" partitions from one or more disks, and oversees certain operations, such as parity calculations.

The communications manager 240 of adapter 150 cooperates with the communication manager 230 of the host computer 110 to provide a communications interface for the file array architecture. That is, the host communication manager 230 comprises the interface support needed for the host computer to communicate with the file array adapter, whereas the adapter communication manager 240 supplies routines necessary for the file array adapter to respond and initiate command traffic to the host.

The interface support provided by the host communication manager 230 includes elevated priority code, interrupt service routines, synchronization between communication resources, such as control status registers (CSRs), and adapter error recovery/reporting. It should be noted that error recovery/reporting support is limited to adapter hardware/firmware errors. Specifically, the host interface support comprises two major functional units: communication and hardware abstraction level (HAL) routines. The HAL routines supply the primitives needed to isolate the host communication manager 230 from bus interface or data processing platform details. Typically, interrupt service routines (ISRs) call the HAL routines directly.

The routines supplied by the adapter communication manager 240 are layered to allow flexibility in the implementation of the actual hardware. Synchronization is handled by individual functions of each layer because of differing synchronization requirements between each layer. An elevated level of priority is needed to span the functions; this forces a calling entity to use care not to lower priority between calls.

The highest layer presents a simple interface to the server file system 250 that allows it to send and receive communication information to and from the client file system 220. A communication primitive layer handles all queue manipulation and notification of queue state changes; significantly, this layer functions without knowledge of the actual hardware communication implementation. A HAL layer implements the routines needed to support the memory-based queuing model. By supplying hardware-like functionality, the HAL routines allow changes in the hardware to be reflected in the routines.

File Array Transport Mechanism

In accordance with the present invention, a file array communication transport mechanism is provided for transporting unique packets among the distributed file system and I/O subsystem components of the file array storage architecture. The unique packet is a command-specific file array information block (FIB) allocated from host memory 330 and containing all of the state required to express a complete I/O operation, such as the transfer of information between the host computer 110 and adapter 150. In order to efficiently perform this operation, the host and adapter exchange messages, e.g., commands and responses, in accordance with file array protocols.

Broadly stated, an I/O transaction is issued from application 270 to the file array client driver 222 via an I/O request packet (IRP). When the IRP enters the client file system 220, the file array client 222 proceeds with any host-dependent processing of the transaction; when that portion of the transaction is complete, the remaining portion is forwarded by the host to the file array adapter 150 in accordance with the transport mechanism of the present invention. In short, the client file system 220 sends a command to the server file system 250 to perform an operation and, upon completing that operation, the server 250 returns a response to the client 220.

To facilitate this exchange, the client and server typically communicate via locations in host and adapter memory that are accessible by both the client file system, i.e., the host CPU 112, and the server file system, i.e., the adapter CPU 152. These locations are organized to provide data structures such as queues and virtual registers. In addition, the host computer and adapter include resources configured to provide hardware registers and logic circuits for effecting communication over the interface 102.

Figure 3:
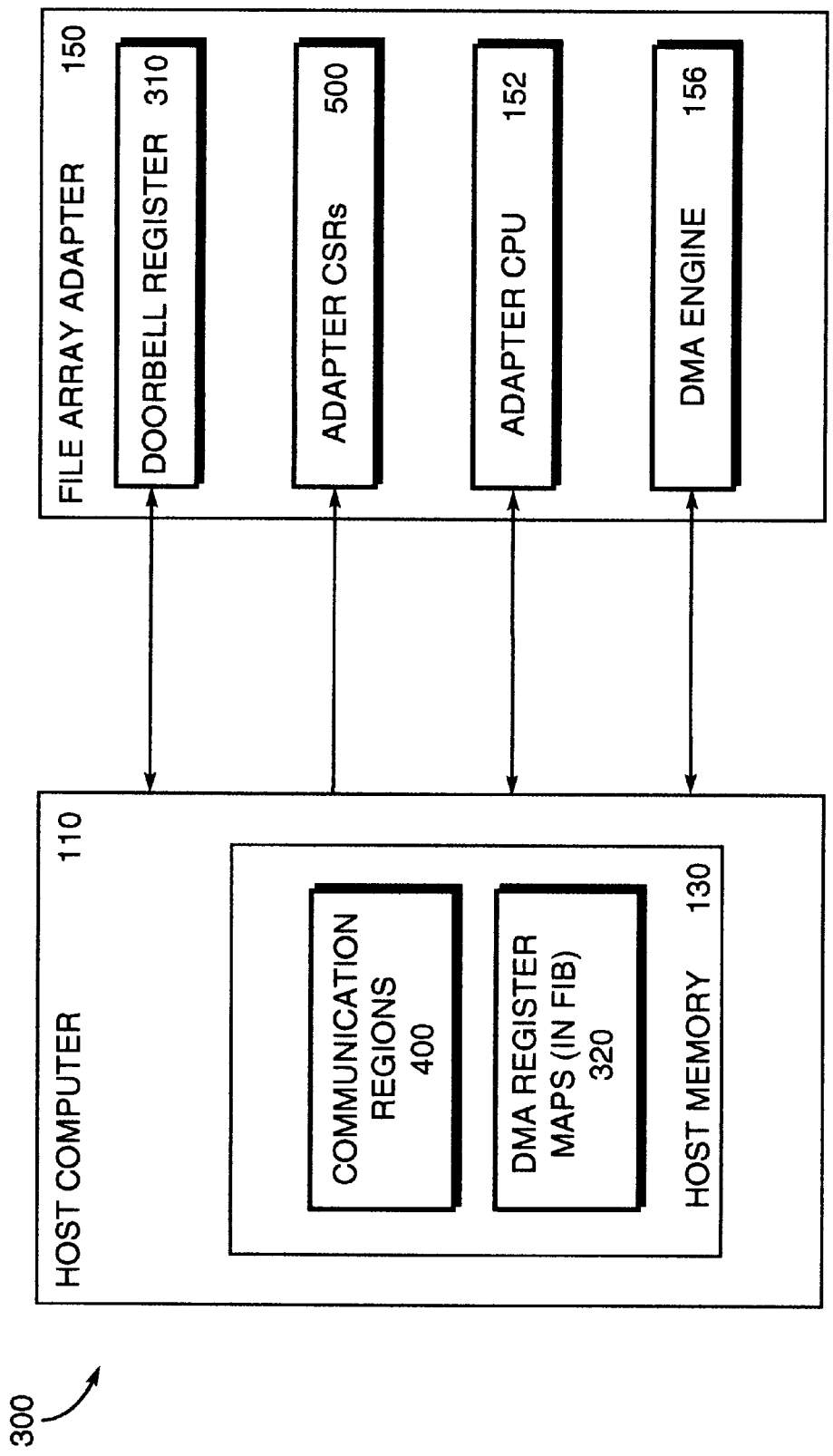
FIG. 3 is a schematic block diagram of a file array communications transport mechanism in accordance with the present invention.

FIG. 3 is a schematic block diagram of the file array communication transport mechanism 300 comprising an arrangement of logic circuits and data structures needed to transport the FIB packets over the file array communications interface. The transport mechanism 300 is preferably implemented according to a memory-based model comprising (i) host memory-based communication regions 400; (ii) an adapter-based "doorbell register" 310; (iii) sets of adapter CSRs 500; (iv) DMA engine 156 for directly accessing host memory; (v) the adapter CPU 152; and (vi) DMA register maps 320.

The communication regions 400 comprise independent host physical memory locations that are shared (i.e., read and written) by the adapter and the host computer. In particular, these regions comprise physically contiguous memory locations allocated by the host operating system 132; during an initialization sequence, the adapter 150 is presented with a staring address and size of each communication region via an adapter CSR. In an alternate embodiment of the invention, the physically contiguous communication region locations may be organized as a ring structure; however, in the illusive embodiment of the invention, the contiguous locations are preferably organized as command and response queues.

Figure 4:
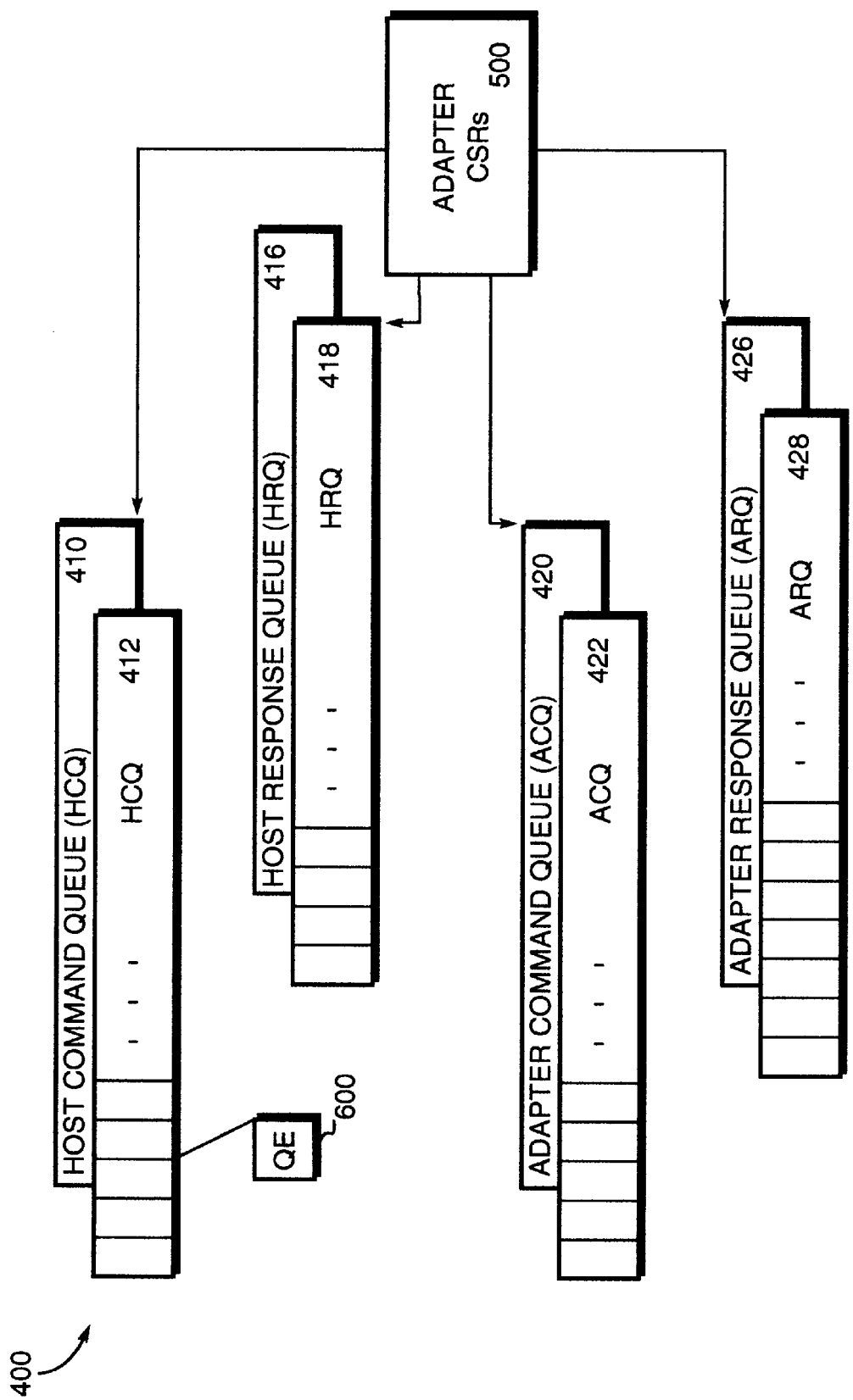
FIG. 4 is a schematic block diagram of communication regions organized as command and response queues for transferring information between a host computer and a file array adapter.

Specifically, the file array architecture defines a set of high and normal priority command and response queues for use by the host computer and the adapter to initiate a command. FIG. 4 is a schematic block diagram of the communication regions 400 that comprise two host command queues 410, 412 and two adapter command queues 420, 422; in addition, the command queues have associated response queues 416, 418 and 426, 428, respectively. Each queue further requires access to a set of adapter CSRs 500 and to the doorbell register 310 (FIG. 3); the doorbell register is preferably a CSR used for generating a unique interrupt to notify the receiver (host or adapter) that there has been a change in state of the queue.

Figure 5:
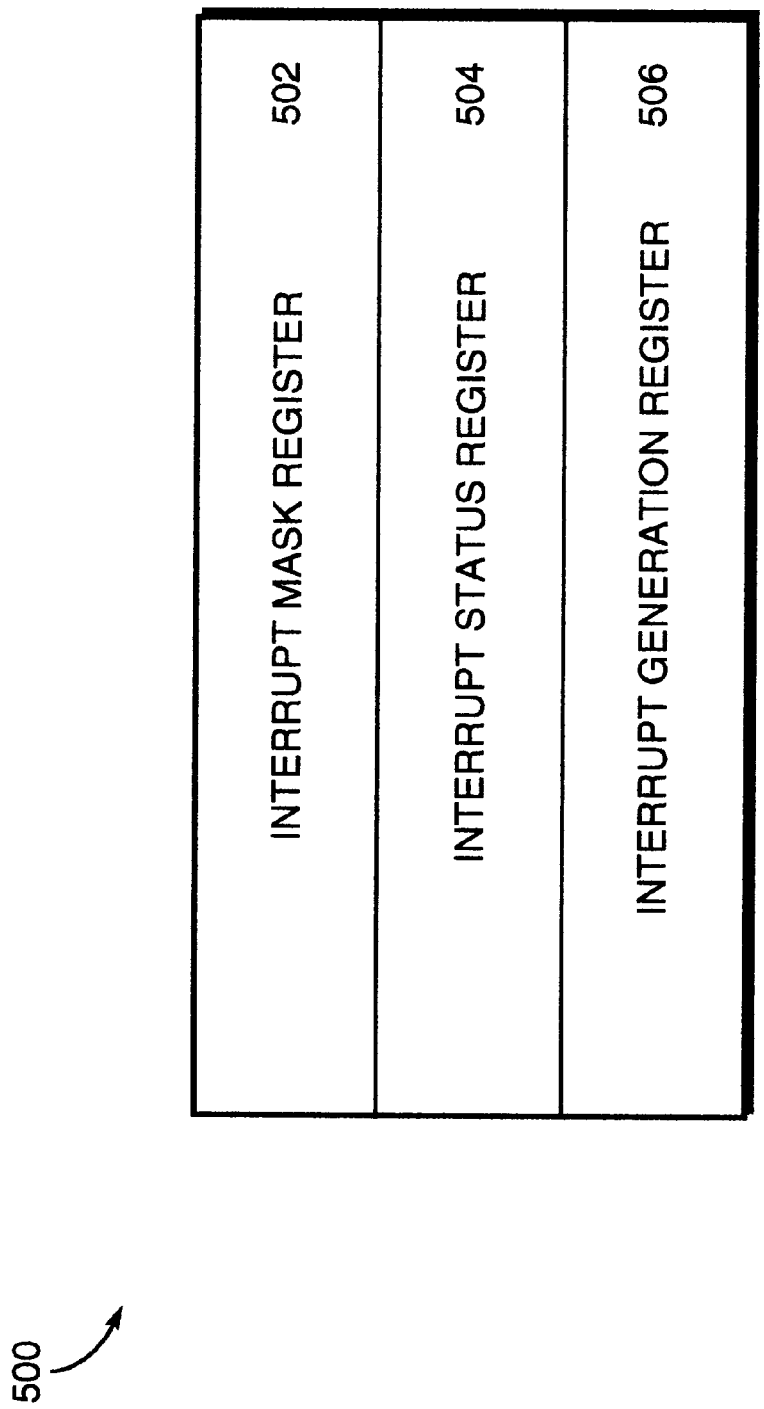
FIG. 5 is a schematic diagram illustrating a set of adapter control status registers that specify the locations of the queues in host memory of the host computer.

FIG. 5 is a schematic diagram illustrating a set of adapter CSRs 500. The set 500 contains an interrupt mask register 502, an interrupt status register 504 and an interrupt generation register 506. The mask register 502 enables/disables each type of interrupt. The interrupt status register 504 shows the current requested interrupts and allows clearing of these interrupts by a write-one-to-clear method. The interrupt generation register 506 generates an interrupt request when written. Each register within a set is preferably a bit mask register.

Each queue comprises a head (H), a tail (T) and a number of queue entries 600 (FIG. 4), each of which is a placeholder used to communicate an I/O operation between the host 110 and the adapter 150. Control and data transfer from the host to the adapter, and from the adapter to the host, depends on the size and type of information transferred. Each queue entry (QE) contains the size and address (as understood by a receiver) of a FIB. A FIB is generally passed between the host and adapter under control of the adapter CPU 152; all other information transferred between the host and adapter (including the data pointed to by the map registers 320) use the adapter-based DMA capability. The DMA engine 156 supports mapped transfers to enable non-physically contiguous information transfers. The DMA maps 320 are embodied within the FIBs, although they may comprise actual hardware registers or virtual registers constructed in host memory; multiple maps may be chained together. Each map 320 supports a byte count that allows different size non-contiguous pieces of memory to be transferred and chained together.

Figure 6:
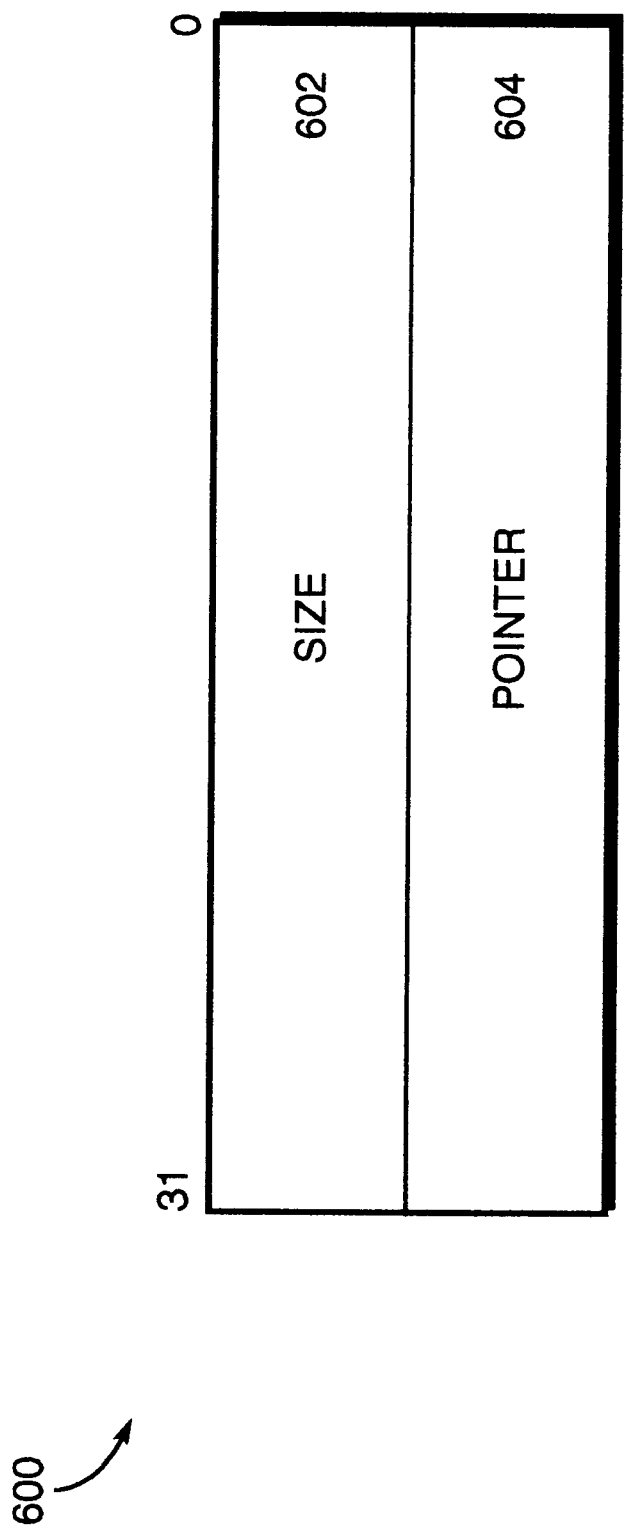
FIG. 6 is a schematic diagram of the format of a queue entry of the queues shown in FIG. 4.

FIG. 6 is a schematic diagram illustrating the format of a QE 600. Each QE is fixed in size and thus cannot be used to express the state of all of the various types of I/O operations executed by the file array system. Accordingly, each QE contains a 4-byte size field 602 specifying the size of a referenced FIB and a 4-byte pointer field 604 whose contents reference the address of a FIB in host memory. Thus, two basic control structures are allocated in host memory for communication exchanges between the host computer and file array adapter: a QE and a FIB. The QE is the lowest level of communication between the host and adapter; the host uses the QE to instruct the adapter as to the location of the FIB. The host also stores the address of the IRP in the FIB for I/O completion processing on the host.

Communication between the host operating system 132 and the file array adapter 150 involves exchanging FIBs to deliver I/O functions through QEs passed within the queues. The I/O functions implemented by the file array architecture include (i) file system type I/O functions—these functions map directly to file system I/O functions such as read, write, create, delete operations; (ii) disk/raw type I/O functions—these functions are used when the file array system operates in "raw" mode such that I/O requests are passed directly through the file array file system to a target storage device; (iii) control/configuration type I/O functions—these functions are used to configure hardware or software resources of the file array adapter and modify other volatile and non-volatile state of the file array adapter; (iv) diagnostic and test type I/O functions—these functions are used to diagnose and test the operation of the file array adapter; and (v) administration functions—these are commands targeted to different levels of the file array adapter that contain information required for the administration of those levels. An example of such a function is a command to the container level of the adapter, instructing the adapter to "turn-on striping".

Figure 7:
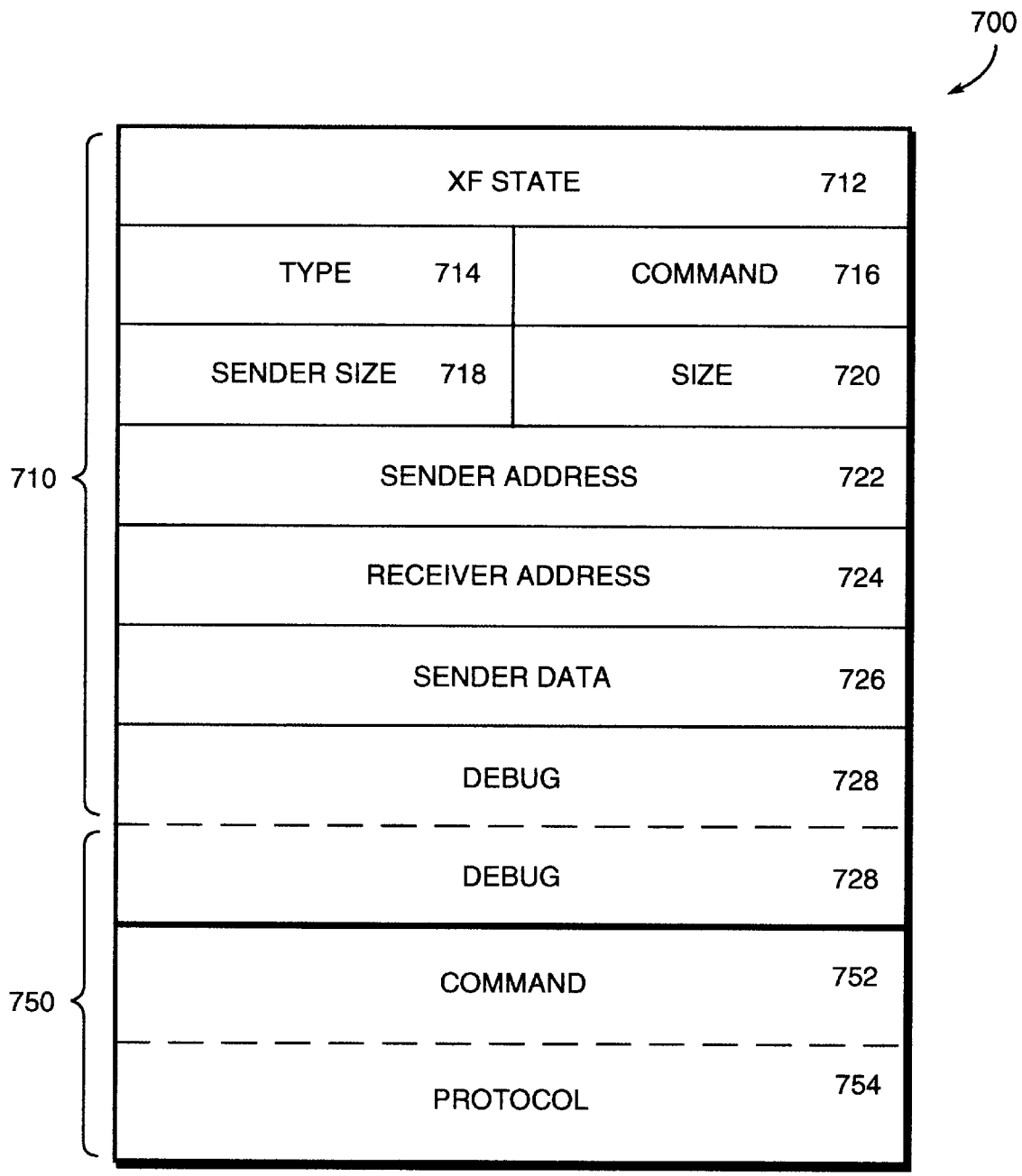
FIG. 7 is a schematic block diagram depicting the format of a file array information block (FIB) according to a file array protocol of the present invention.

FIG. 7 is a schematic block diagram depicting the format of a FIB 700; preferably there is a unique FIB for each type of file system operation. The file array system directly implements file system operations using the same general semantics as existing host-resident file systems. These operations map directly to the I/O functions supported in the host operating system (Windows NT and Unix) file systems.

The FIB 700 generally comprises a header 710 and a command-specific body 750. The header 710 includes a XFSTATE field 712 that identifies the communication nature of the FIB, a TYPE field 714 that identifies this structure as a FIB and a COMMAND field 716 contains routing information for the FIB (i.e., information as to where the communication protocol routes the FIB). A SENDER SIZE field 718 and a SIZE field 720 each contain size information (in bytes) for the command-specific body (or data portion) of the FIB. The SIZE field 720 specifies the actual size of the command transferred with the FIB (which is equal to the size of a QE), whereas the SENDER SIZE field 718 specifies the maximum size of the command allocated by the host. This latter field 718 informs the receiver that a response may be returned that is larger than the transferred command. A SENDER ADDRESS field 722 contain host defined data in the FIB, whereas a RECEIVER ADDRESS field 724 contains the logical address of the FIB in host memory. A SENDER DATA field 726 is a placeholder for the sender to store data and the contents of DEBUG fields 728 are used for performance analysis.

The header 710 is interpreted by the communications managers to determine which process (or thread) should receive the command-specific body 750 of the FIB. A COMMAND field 752 of the command-specific body 750 indicates the request (such as a read or write request) specified by the FIB and the remaining PROTOCOL field 754 contains protocol-specific information associated with the request. Examples of the various types of file array protocols that operate with the communications interface described herein include a file system protocol, a container protocol, a low-level communications protocol and a maintenance protocol.

Figure 8:
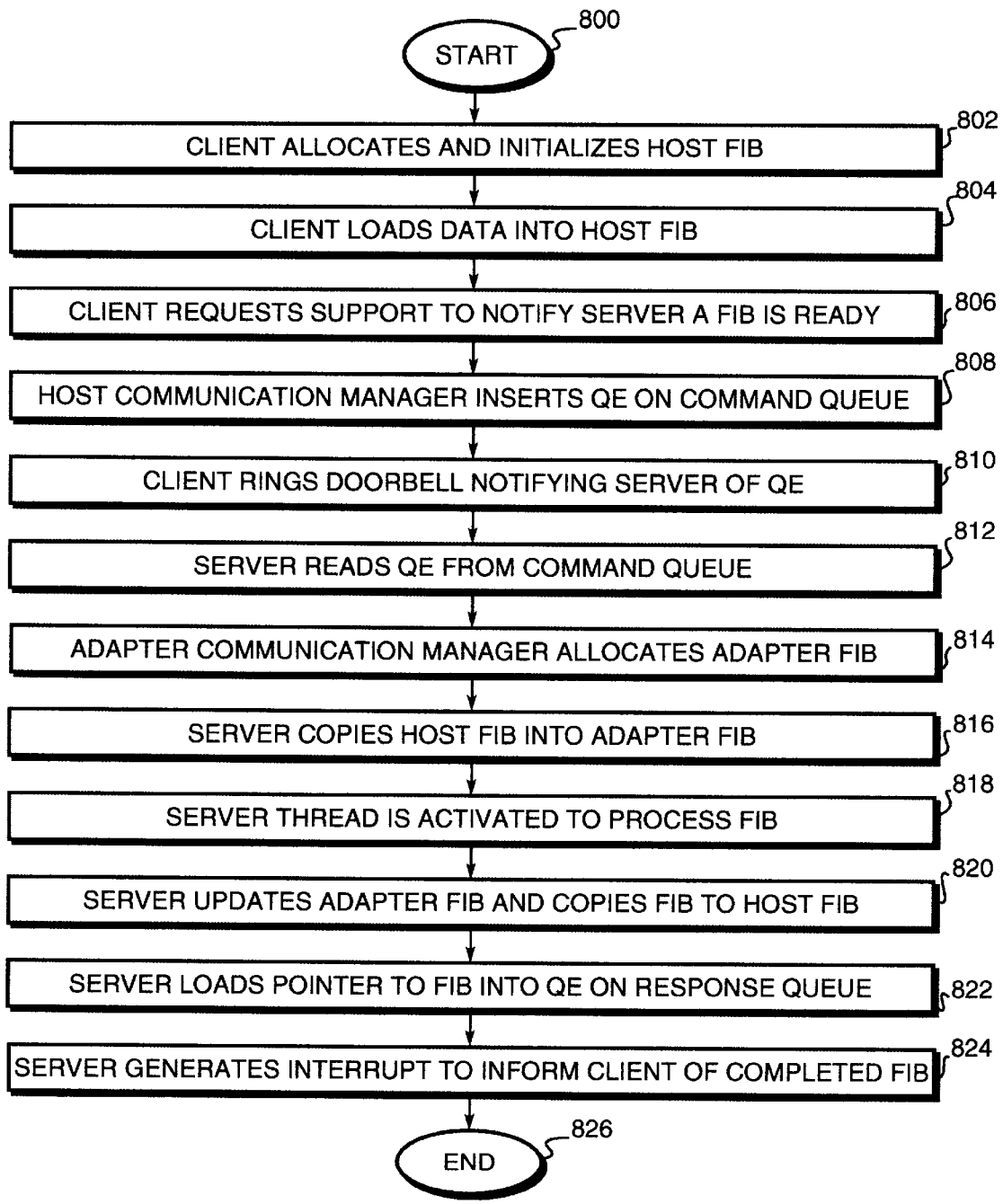
FIG. 8 is a flowchart illustrating the sequence of steps involved in host computer-to-file array adapter communication when executing a typical I/O operation according to the file array protocol of the present invention.

FIG. 8 is a flowchart illustrating the sequence of steps involved in host-adapter communication when executing a typical I/O operation according to the communication protocol of the present invention. The sequence starts at Step 800 and proceeds to Step 802 where the host CPU (i.e., file array client driver 222) allocates and initializes a FIB. In Step 804, the file array client loads file system data into the FIB and in Step 806, the client requests communication support to notify the server file system 250 that a FIB is ready for transfer. In response to the transfer request, the host communication manager 230 requests a QE and "inserts" the QE on a command queue of host memory in Step 808. The QE contains a pointer referencing the address of the FIB in host memory. In Step 810, the client 222 "rings" the doorbell, i.e., sets a flag within the doorbell register 310, to notify the adapter that a QE is ready in the command queue and, in Step 812, the adapter CPU (i.e., the file array server driver 252) reads the QE from the command queue.

The communication manager 240 of the adapter allocates a local, adapter FIB for copying the host FIB in Step 814. The communication manager 240 contains all ISR routines and is responsible for manipulation of the QE structures, along with allocation and de-allocation of the adapter FIB. In general, control flows on the adapter are initiated either by host notification that a QE is ready to be received (i.e., a QE ready interrupt) or by the file array server 252 requesting transfer of a QE to the host. In Step 816, the server "frees" the QE by copying the host FIB into the adapter FIB.

In Step 818, a thread waiting on the FIB is activated when the QE ready interrupt is received; specifically, the server 252 "wakes up" a QE receive thread which proceeds to "loop" until all QEs on its receive queue have been consumed. The server thread then processes the FIB by executing the I/O operation described therein. In Step 820, the file array server updates the adapter FIB with return data (if any) and copies the adapter FIB to the host FIB, thereby overwriting the original FIB in host memory. In Step 822, the server driver 252 loads a pointer to the executed FIB into a QE on a response queue in host memory and, in Step 824, the server generates a host interrupt to inform the client 222 that a FIB has been completed. The sequence then ends in Step 826.

Thereafter, the client removes the QE from the host response queue and checks its completion status. Armed with the IRP and completion status, the host may complete I/O processing and, thereafter, return the completion status to the caller.

While there has been shown and described an illustrative embodiment for transporting unique packets between a host computer and an adapter of a data processing platform in accordance with a file array communications transport, it is to be understood that various other adaptations and modifications may be made within the spirit and scope of the invention. For example in an alternate embodiment of the invention, the file array adapter 150 may send unsolicited requests to the host computer; these requests are typically error-status notifications or requests from the server file system 250 to the client file system 210. The transport mechanism provides normal and high priority communication queues to facilitate these communication requests.

Figure 9:
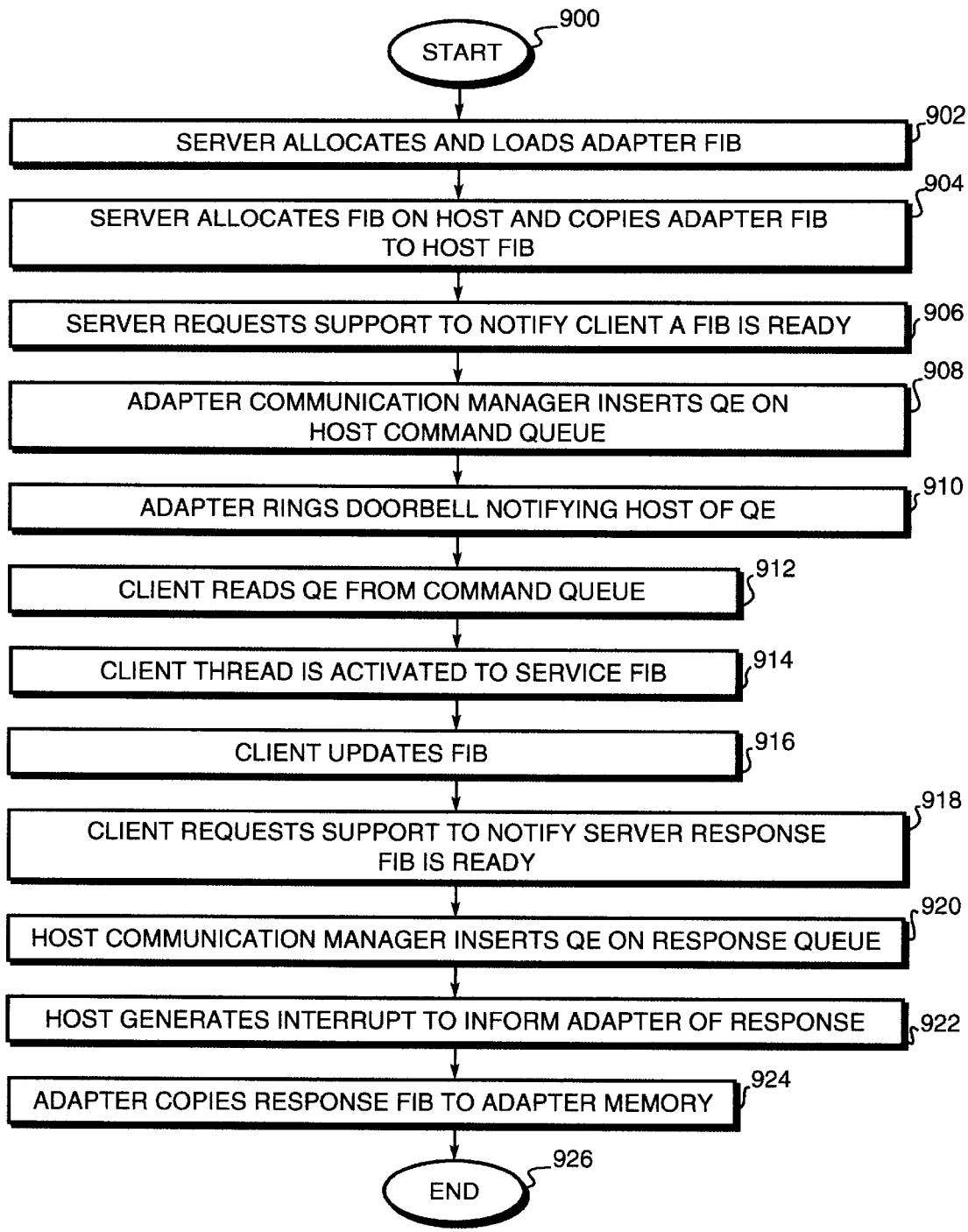
FIG. 9 is a flowchart illustrating the sequence of steps involved in file array adapter-to-host computer communication according to the file array protocol of the present invention.

FIG. 9 is a flowchart illustrating the sequence of steps involved in the file array adapter-to-host computer communication according to the file array protocol of the present invention. In general, host storage for such adapter-initiated FIB traffic is presented to the adapter at the latter's boot time. A block of FIBs in host memory is managed by the adapter; the host has no "visibility" into this block of memory except when a QE is passed to the host with an address pointing to a FIB within the block.

The sequence starts at Step 900 and proceeds to Step 902 where the server file system 250 allocates and loads the contents of an adapter FIB. In Step 904, the server allocates a FIB in host memory ("host FIB") and copies the adapter FIB to the host FIB. In Step 906, the server requests communication support to notify the client file system 220 that a FIB is ready for transfer. In response to the transfer request, the adapter communication manager 240 requests a QE and "inserts" the QE on a command queue of host memory in Step 908. The QE contains a pointer referencing the address of the FIB in host memory. In Step 910, the server 252 "rings" the doorbell, i.e., sets a flag within the doorbell register 310, to notify the host that a QE is ready in the command queue and, in Step 912, the host CPU (i.e., the file array client driver 222) reads the QE from the command queue.

In Step 914, a client thread waiting on the FIB is activated to service the QE. Specifically, the client thread processes the FIB by executing the I/O operation described therein. In Step 916, the file array client updates the FIB with return data (if any) and, in Step 918, the client driver 222 requests communication support to notify the server 250 that a response FIB is ready. In Step 920, the host communication manager 230 requests a QE and "inserts" the QE on a response queue of host memory. The client 222 generates an interrupt (by ringing the doorbell) in Step 922 to notify the adapter that a QE is ready in the response queue and, in Step 924, the adapter CPU (i.e., the file array server driver 252) copies the response FIB to adapter memory. The sequence then ends in Step 926.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for communicating between a host computer and an adapter of a data processing platform over an interface, the apparatus comprising:

communication regions in host memory of the host computer that are shared by the adapter and host computer, the communication regions comprising at least one placeholder for communicating an input/output (I/O) operation; and a file array information block (FIB) referenced by the placeholder, the FIB containing information needed to execute the I/O operation between the host computer and the adapter.

2. The apparatus of claim 1 wherein the communication regions comprise host memory locations organized as independent command and response queues.

3. The apparatus of claim 2 further comprising a doorbell register for generating a unique interrupt to notify one of the host computer and adapter that there is a change in state of the placeholder in a queue.

4. The apparatus of claim 3 wherein the placeholder is a queue entry.

5. The apparatus of claim 3 wherein the queue entry comprises a size field and a pointer field.

6. The apparatus of claim 5 wherein contents of the size field specify a size of the referenced FIB and wherein contents of the pointer field specify an address of the referenced FIB in host memory.

7. The apparatus of claim 1 wherein the FIB comprises a header and a command-specific body.

8. The apparatus of claim 7 wherein the header comprises a xfstate field that identifies a communication nature of the FIB.

9. The apparatus of claim 8 wherein the header further comprises a command field containing routing information for the FIB.

10. The apparatus of claim 9 wherein the header further comprises a sender size field that specifies a maximum size of a command allocated by the host and transferred with the FIB.

11. The apparatus of claim 10 wherein the header further comprises a size field that specifies an actual size of the command transferred with the FIB.

12. The apparatus of claim 11 wherein the header further comprises a receiver address field that contains a logical address of the FIB in host memory.

13. The apparatus of claim 12 wherein the header further comprises a sender data field that is an additional placeholder for a sender to store data.

14. The apparatus of claim 7 wherein the command-specific body comprises a command field that indicates a request specified by the FIB.

15. The apparatus of claim 14 wherein the command-specific body further comprises a protocol field that contains protocol-specific information associated with the request.

* * * * *